(12) United States Patent
Soderstrom

(10) Patent No.: US 7,792,516 B2
(45) Date of Patent: Sep. 7, 2010

(54) PURCHASE CARD SYSTEM AND METHOD THEREFOR

(76) Inventor: Tonie Soderstrom, Danderydsvagen 28, 144 26 Stockholm (SE)

( * ) Notice: Subject to any disclaimer, the term of this patent is extended or adjusted under 35 U.S.C. 154(b) by 0 days.

(21) Appl. No.: 11/718,790

(22) PCT Filed: Nov. 7, 2005

(86) PCT No.: PCT/US2005/040153

§ 371 (c)(1),
(2), (4) Date: May 7, 2007

(87) PCT Pub. No.: WO2006/052815

PCT Pub. Date: May 18, 2006

(65) Prior Publication Data

US 2007/0299773 A1    Dec. 27, 2007

Related U.S. Application Data

(60) Provisional application No. 60/522,791, filed on Nov. 8, 2004.

(51) Int. Cl.
*H04M 11/00* (2006.01)

(52) U.S. Cl. .......... 455/406; 455/405; 455/407; 455/408

(58) Field of Classification Search .......... 455/406, 455/405, 407, 408
See application file for complete search history.

(56) References Cited

U.S. PATENT DOCUMENTS

| | | | |
|---|---|---|---|
| 6,868,391 B1* | 3/2005 | Hultgren | 705/26 |
| 7,292,996 B2* | 11/2007 | Nobrega et al. | 705/39 |
| 2001/0005840 A1* | 6/2001 | Verkama | 705/67 |
| 2002/0115424 A1* | 8/2002 | Bagoren et al. | 455/408 |
| 2003/0189095 A1* | 10/2003 | Tuilier | 235/435 |
| 2004/0073519 A1* | 4/2004 | Fast | 705/65 |
| 2005/0097015 A1* | 5/2005 | Wilkes et al. | 705/30 |

* cited by examiner

*Primary Examiner*—Barry W Taylor
(74) *Attorney, Agent, or Firm*—Rolf Fasth; Fasth Law Offices

(57) ABSTRACT

The system allow users of cell phones the use of their cell phone account via a cash card, purchase card or credit card to effect transactions at existing terminals that are connected to card handling companies. Each respective card refers to the SIM-card in the cell phone. This SIM-card is the base for a specific account with the cell phone system operator, which in turn is connected on-line with card handling companies having terminals distributed for card transactions.

8 Claims, 2 Drawing Sheets

PURCHASE CARD SYSTEM AND METHOD THEREFOR

PRIOR APPLICATION

This application is a U.S. national phase application based on International Application No. PCT/US2005/040153, filed 7 Nov. 2005, claiming priority from U.S. Provisional Patent Application No. 60/522,791, filed 8 Nov. 2004.

FIELD OF THE INVENTION

The present invention relates to a purchase card system. More particularly, the present invention is related to a security arrangement for a purchase card system.

BACKGROUND OF THE INVENTION

Payment cards in the form of cash cards, purchase cards and credit cards overflow the market today. Essentially all department-stores, larger food-stores, mail-order companies, gas-companies, card-companies have one or many of the card types available to customers. Most have all three alternatives.

If the user wants a cash card the customer can apply for this at the bank or company the user would like to use. If accepted, this means that the user can only use the money on the account in the respective bank or company that has issued the card.

If the user wants a purchase card, the user has to apply for this at the company in question. If accepted, this means that the user's purchases are debited once a month or as agreed.

If the user applies for a credit card the credit is on a pre-established sum with normally requires a monthly payment to the bank or company giving the credit.

In order to obtain any of these payment alternatives the user must be over 18 years of age and have a good credit record. The time for handling the card applications vary. However, it frequently takes between 2 to 4 weeks after the applicant has been accepted until the applicant receives get the card.

Due to the rules requiring the applicant to be over 18 and with a good credit record, the number of possible transactions via existing terminals, remaining card payment and Internet commerce are reduced.

The security associated with the currently available cash cards, purchase cards and credit cards are unsatisfactory. Anybody can have the cards unlawfully used through skimming, cloning or by an unauthorized person getting hold of a card number and card data in order to execute transactions on Internet. The result of this may have unforeseeable consequences for the unfortunate victim who may get his account emptied or his credit is unlawfully used by another.

One object of the present invention is to eliminate the above problems and improve security related to payments by means of different types of payment cards and the like so that banks as well as customers run less risk when the cards are used. Another object of the present invention is to make the payment cards available to persons that today cannot qualify to gain access to conventional payment cards.

SUMMARY OF THE INVENTION

The above problems are in accordance with the present invention solved by adding to the payment card a telephone and a SIM-card for telephoning. The payment card may be linked to or co-programmed with the SIM-card so that when confirming a payment with the payment card it is required that a telephone with the inserted SIM-card transfers information to an intended number or is called for payment confirmation of the telephone user. To further increase the security gained in this way and to increase the user's control respectively further measures may be required or used during payment.

Further advantageous developments of the inventive concept are apparent from the detailed description below and the described advantageous examples of the present invention and its use with reference to the drawings.

DETAILED DESCRIPTION

Figure 1:
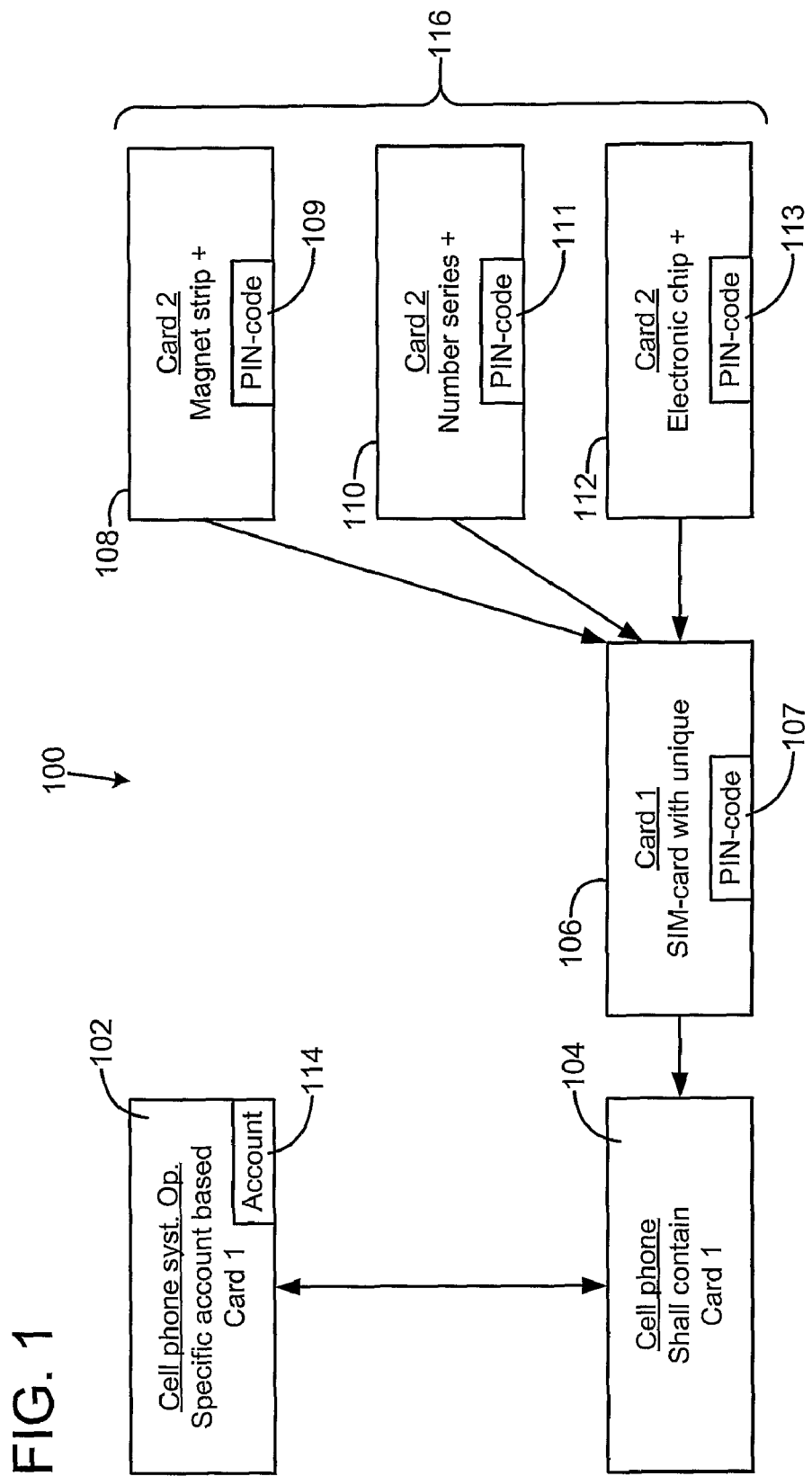
FIG. 1 is a schematic view of a first system in accordance with the present invention.

The two-card system or multiple-card system in accordance with the present invention can for instance be used by a mobile or cell phone system operator, in accordance with FIG. 1. More particularly, the system 100 has a cell phone system operator 102 that runs a telephone network. A cell-phone 104 is connected to the network of the operator 102. The cell-phone has a first card 106, such as a SIM card with a unique PIN code 107, disposed therein. The first card 106 is associated with a specific account 114 of the operator 102. The user may then have second cards 116 that preferably are transaction cards such as cards 108, 110 and 112 connected to the system 100. The card 108 may have a magnetic strip and a unique PIN code 109. The card 110 may have a number series and a unique PIN code 111. The card 112 may have an electronic chip and a unique PIN code 113. As explained in detail below, the user may use the transaction card 116 to obtain services or products. The costs of the transaction may then be charged to the specific account 114.

For example, the operator may use the operator's existing system in such a way that the operator can offer a new customer a cell phone package including a cell phone and two physical cards. The first card may be a SIM-card containing a unique code. This SIM-card is intended to be placed in the cell phone. When the cell phone is activated a specific account is opened with the identity (IMSI) based on the SIM-card. The second card may be a cash card, purchase card or credit card containing a magnetic strip and/or a chip for electronic reading. The identity, such as a numeric combination and other relevant information, of this card links to the identity of the above-mentioned SIM-card and that at the operator is linked to a specific account. The second card i.e. the payment card may be used for conducting transactions via existing terminals in stores, restaurants, shops etc. and for transactions over Internet. The transactions are debited to the specific account to which the card is linked.

The cell-phone system-operator and/or card issuer may set up existing systems in such a way that they can offer an existing customer a cash card, purchase card or credit card that via a code on a magnet strip or series of numbers on the card or the code in a chip refer to an existing SIM-card that is located in an existing cell-phone and serves as base for a specific account with the cell phone system operator. This card is intended for use for transactions via existing terminals in department stores, restaurants, shops or the like that are telephone-based transactions and transactions over the Internet. The transactions are debited to the specific account of the cell-phone operator.

The cell-phone system operator and/or card issuer may set up existing systems in such a way that they can offer the owner of an open cell-phone a start package containing two physical cards. The first card is a SIM-card containing a unique code. This SIM-card may be placed in the cell phone. When the cell phone is activated a specific account is opened based on the SIM-card code. The second card is a cash card, purchase card or credit card containing a magnetic strip, a numeric code and/or a chip for electronic reading. The codes of the second card refer to the code in the SIM-card and are at the operator linked to a specific account. The second card or payment card is may be used for transactions via existing terminals in department stores, restaurants, shops that are telephone based transactions and for transactions over the Internet. The transactions are charged to the specific account of the cell phone system operator.

The cell phone system operator and/or card issuer may arrange existing systems in such a way that it is possible to connect on-line to a card administrating company that have existing terminals placed in department stores, shops, restaurants, gas stations and the like as well as transaction over the Internet. In this way, all customers with this system connected to the cell phone system operator with respective specific account can execute transactions in exactly the same way as the customers today execute transaction with any cash card, purchase card or credit card. The difference is that the transactions are charged to the same account as the cell phone when user calls or otherwise makes use of other phone services.

The cell phone system operator and/or card issuer may arrange existing systems in such a way that to each cash card, purchase card or credit card is associated with a PIN-code that must be given to each specific account at the cell phone system operator for each transaction. The presenting of the PIN-code to each specific account must be through the cell phone, the SIM-card of which refers to the cash card, purchase card or credit card via the specific account with the cell phone system operator. This can take place via a prescribed direct number which is called from the cell phone in question in order to receive instructions of how to proceed, as best shown in FIG. 2.

Figure 2:
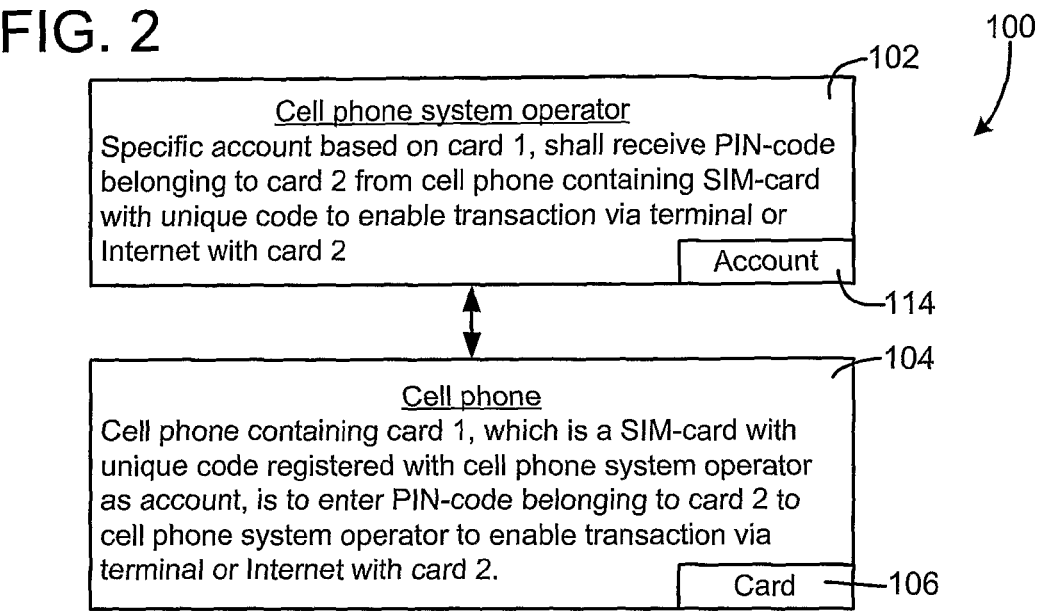
FIG. 2 is a schematic views of a second system in accordance with the present invention.

FIG. 2 shows the system 100 wherein the cell-phone 104 is connected to the cell-phone system-operator 102 and particularly to the specific account 114. The specific account 114 is based on and associated with the first card or SIM-card 106 disposed in the cell-phone 104. In order to withdraw funds from the specific account 114, the account 114 must receive the PIN code from the second card 116, such as one of the PIN codes 109, 111, 113 from the cell-phone 104 that has the SIM card 106 including the PIN code 107 disposed therein. The cell-phone 104 contains the SIM card 106 with the unique PIN code 107 that is registered with the operator 102 and associated with the specific account 114. For example, in order to complete a transaction with the card 108, the user must use the cell-phone 104 so that the operator 102 knows which specific account 114 should be activated. The user must then enter the PIN code 109 of the card 108 to enable the transaction with the card 108.

The cell phone system operator and/or card issuer may arrange existing systems in such a way that if the owner of the cell phone with the linked SIM-card and cash card, purchase card or credit card which are related to a specific account with the cell phone system operator, forgets to send his PIN-code to the operator and the specific account for the enabling of the transaction, at a transaction at a terminal or internet, an sms or the like message may be sent to the cell-phone of the owner that the PIN-code is missing and that it must be given before the transaction can be effected. When the PIN-code has been entered for a specific account with the cell-phone system-operator the transaction will be allowed, as shown in FIG. 2.

The cell phone system operator and/or card issuer may arrange existing systems in such a way that the owner of the cell-phone with associated SIM-card and cash card, purchase card or credit card, which together are linked to a specific account at the cell-phone system-operator, can transfer money from user's own specific account to another cell phone user with a specific account in the same system. This is executed by the sender of the money by calling a prescribed number to the cell phone system operator. The sender then enters the sender's PIN-code and indicates to which number and the amount of money that is to be sent. If the PIN-code is correct and there is enough money on the account of the sender the money is immediately transferred without delay to the receiver, as best shown in FIG. 3.

Figure 3:
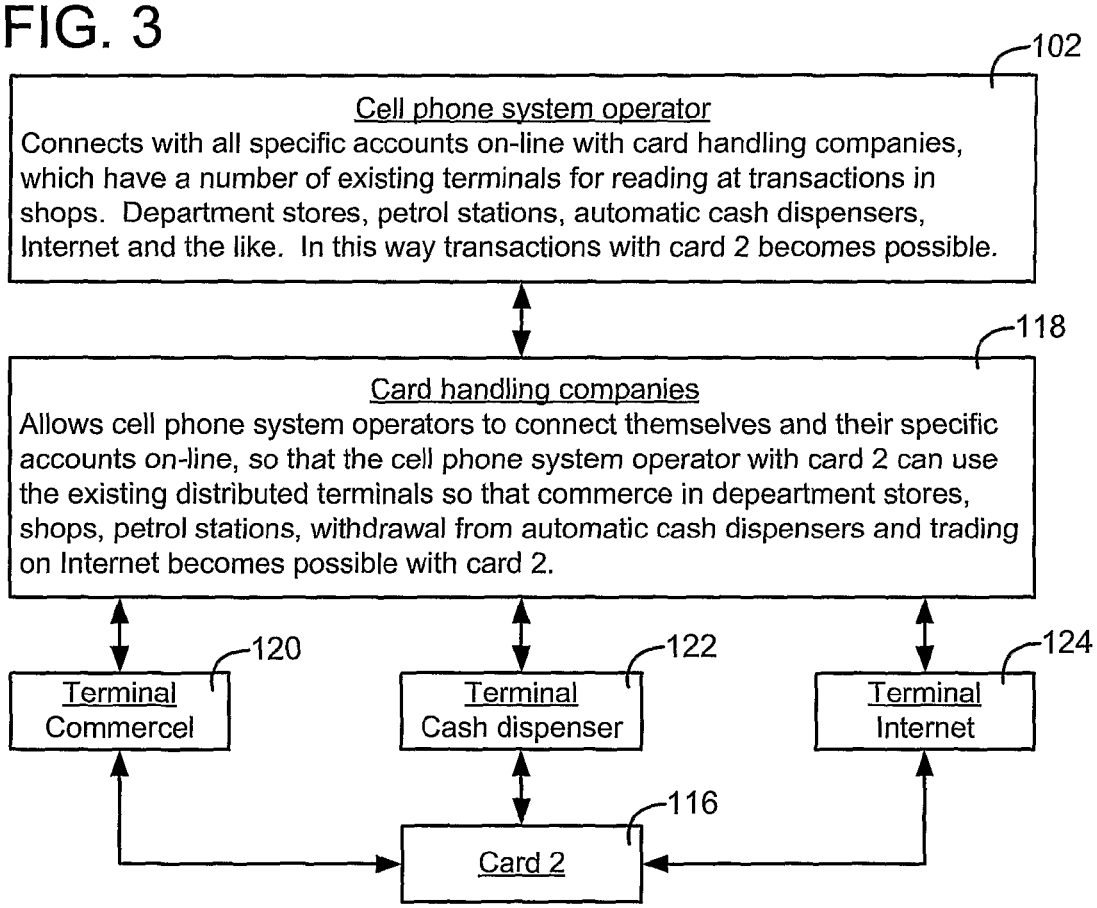
FIG. 3 is a schematic view of a third system in accordance with the present invention.

FIG. 3 details the interaction between the operator 102 and card handling companies 118. The operator 102 may connect the specific account 114 with terminals 120, 122, 124 of the card handling companies 118. The terminal 120 may be placed at a commercial place such as department stores, gas stations or any other places where the user can gain access to the terminals. The terminal 122 may be cash dispenser and the terminal 124 may be accessible via the Internet. The transaction card 116 of the user may gain access to all the terminals 120, 122, 124 and other terminals that are connected to the on-line specific account 114 as long as the user also provides the PIN code of the second card 116 by using the cell-phone 104 that includes the SIM card 106.

The cell phone system operator and/or card issuer may arrange existing systems in such a way that the depositing of money can take place to the specific account that exists for each cell-phone with SIM-card. The SIM-card has a cash card, purchase card or credit card linked to it. This can take place by the user going to an existing terminal in a shop, department store, restaurant or the like, to indicate the sum the user wants to have deposited and pay it. Thereafter, the card is drawn and the amount that is to be deposited is immediately registered and can be used to execute previously mentioned transactions at terminals and Internet via the stationary telephone network and the cellular mobile services offered by the cell-phone system-operator. The costs for these services and transactions are drawn from the specific account of the owner of the cell-phone at the phone operator, as shown in FIG. 3.

The cell-phone system-operator and/or card issuer may arrange existing systems in such a way that deposits of money can take place to the specific account that exists for each cell phone with SIM-card, which has a cash card, purchase card or credit card linked to it. This can be done by the user depositing a specific amount each month from the user's account to the specific account of the cell phone at the cell-phone system-operator. This deposited amount is immediately registered and may be used for executing the previously mentioned transactions via terminals and the Internet via the stationary telephone network, and the cell phone services offered by the cell-phone system-operator. The costs of these services and transactions are deducted from the specific account of the user.

The cell phone system operator and/or card issuer may arrange existing systems in such a way that deposits of money can take place to the specific account that exists for each cell phone with SIM-card, which has a cash card, purchase card or credit card linked to it. This can take place by the user depositing money to the specific account of the cell-phone at the cell-phone system-operator. This deposited amount is immediately be registered and may be used for the executing of the previously mentioned transactions via terminals and the Internet, via the stationary telephone network, and the cell phone services offered by the cell-phone system-operator. The costs of these services and transactions are deducted from the specific account.

When the cell phone system operator has arranged its own system according to the present invention, all frauds with cash cards, purchase cards and credit cards are ceased both when it comes to skimming and cloning of cash cards, purchase cards and credit cards. Furthermore, fraud on the Internet stops when the system is used. This depends on the requirement that it is necessary to enter the corresponding PIN-code to the operator and the specific account through the user's own cell phone with corresponding SIM-card, before a transaction can be executed.

Cell phone system operators may have cash card phones, which in particular are intended for persons under 18 years and for persons who cannot get a cell phone subscription. This also means that the same group of persons cannot get access to a cash cards, purchase cards or credit cards. With the use of the present invention however also these persons can have pay-cards with the exception of credit card. This includes about one half of the population. This does not only make things easier for these persons but also the places where the payments take place and thereby the risk for robbery is reduced.

Since the cell phone system operators have an immediate account control at all hours, this will also be true for the cash cards, purchase cards and credit cards. This means that the owner of a cell phone connected to this system at all hours will have control over the money that is available for phoning or executing transactions by using the specific account.

When a new user has obtained a pair of cards and an a telephone from a system operator, the user first inserts the bi-packed SIM-card in the new cell phone and charge the battery in the cell phone. Thereafter the user transfers money to the specific account. When the money is on the specific account, which is possible to check by dialing the given number to the cell phone system operator, the user can start using the services that the cell phone system operator provide for the cell phone and to execute transactions via the cash card, purchase card or credit card via the stationary telephone network or on Internet.

When the user is an existing customer of a cell phone system operator and desires a cash card, purchase card or credit card, according to FIG. 1, the user orders this from the cell phone system operator. The card can then be collected at the post office or the like. Thereafter, the user transfers money to the specific account at the system operator.

When the user has a cell phone that is open, that is not bound by contract or subvention another cell phone system operator, the user can buy a start package as described above. The bi-packed SIM-card is then inserted into the open cell phone and the battery in the cell phone is charged. Thereafter, the user transfers money to the specific account with the system operator. When the money is on the specific account of the operator the user can start using the service as described above.

When the user has a cell-phone, it is possible to execute transactions at all existing terminals placed in department stores, shops, restaurants, petrol stations and the like and transactions on Internet. In this way, all users of the present system are linked to the cell-phone system-operator. By using the specific account the user can execute transactions in exactly the same way as the currently available cash cards, purchase cards and credit cards. The difference is that the transactions are charged to the same account as charges resulting from making phone calls or using other services of the cell-phone.

Before the user of the cell-phone executes a transaction the user must enter the accompanying PIN-code that must be entered for each specific account with the cell phone system operator for each transaction. The entering of a PIN-code to each specific account must be through the SIM-card of the cell-phone which refers to the cash card, purchase card or credit card via the specific account with the cell phone system operator. This can take place via a prescribed direct number which the user calls from the cell phone in question and getting instruction of how to proceed.

If the owner of the cell-phone should forget to enter his PIN-code via the cell phone at a transaction via a terminal or internet, an SMS or the other message may be sent to the cell phone of the owner that the PIN-code is missing and that it must be entered before the transaction is allowed. When PIN-code has been entered to a specific account the transaction will be allowed.

If the owner of the cell phone wants to send money to another cell phone belonging to this system it is possible to transfer money from the user's own specific account to another user of cell phone and specific account in the same system. This is executed by the sender of the money by calling a prescribed number to the cellular telephone system operator. The user then enters the PIN-code and indicates to which number the money is to be sent and the amount. If the PIN-code is right and the amount is on the account of the sender the money will immediately be transferred without delay to the receiver.

Depositing of money on the specific account can also be done. This can take place by the user going to an existing terminal and enter the sum the user wants to have deposited and pay it. Thereafter, the card is drawn and the amount that is deposited and immediately registered. The deposited money can be used to execute previously mentioned transactions at terminals and the Internet. The costs for these services and transactions are be drawn from the specific account of the owner of the cell-phone.

The depositing of money on the specific account of the owner of the cell phone may be executed. This can be done by one depositing a specific amount each month. This deposited amount is immediately be registered and can be used for executing of transactions. The cost of these services and transactions are be deducted from the specific account of the cell-phone owner.

The owner of a cell-phone with related cards and system according to the present invention can at any time check the balance since the cell phone system operator has an immediate balance check at all hours. This also applies to cash cards, purchase cards and credit cards. This means that the owner of the cell phone connected to this system at all hours will have control over the money that is available for phoning or execute transactions on the specific account.

It is also possible to consider the invention used so that before leaving for shopping, the user activates with the phone a payment window within which payment can take place. The payment window can be defined as the time within which payment can take place, for instance only for a day or certain hours. The payment window can instead be defined of how large payments that may be made alternatively how large sum that may be used totally within the window. If this should turn out to be insufficient the user can confirm payments individually or open new window. The payment window can also be geographically limited since the cell phone system operator with the help of the system can establish an approximate geographic position, for instance within the reach of a certain base station, or the reach of several base stations together. The purpose of the restriction is to increase the security when the approximate geographic location of the pay terminal is known by the service provider of the pay terminal, when this is connected to a stationary connection. Mobile terminals also exist and also there the geographic area should be given in order to consider this.

In the case of children the user can require confirmation from the phone of the child, but also from a parent via an additional phone, that is that two phones have to confirm, alternatively that only the parents phone have to confirm, that is the confirming phone does not have to be on the spot where the card is for paying. In these cases, the user can also consider that the parent confirmation only is needed at sums over a fixed limit.

The same phone card can further be used together with several pay cards that may also be of different types and the user can even consider that several phone cards are linked co-programmed with one or a group of pay-cards. The invention can thus be used together with different cards and card types as well as with different accounts and pay-structures in order to improve the safety for card owners as well a card-issuers.

The user can also use the method of the present invention so that for instance below a limited amount only telephone confirmation is used, that is no signing of slips. The user can execute transactions below the limited amount without confirmation, for instance at the dining room of the school or company, where the size of the amount, the geographic location and that the transaction is repeated with a certain periodicity may together or separately be important parameters to allow-confirmation free transactions.

A market that increases all the time is the cell phone market, in particular cash card phones which are charged with an amount at the user's own choice and then can be used to execute the phone services that the cell phone operator can offer. This depends in particular on that the user does not have to be subjected to en examination at all and anyone can get a cash card phone irrespective of if the user us under 18 years or have a poor credit rating.

With the present invention the advantage is obtained that the deposited amount can not only be used for telephoning but also for payment. The user charges for instance the phone with the money that the user expects to need for the cell phone services as calling, sending sms or the like and for payment. In this way, it is possible to use the deposited money in addition to cell phone related services to execute transactions via existing card terminals, as shopping, eat in a restaurant, buy gasoline, draw cash, pay bills or shop on Internet. The result is that the cash card phone is charged with considerably more money than what is the case today. It is also possible to connect the user's salary account directly to the cash card phone. All this would benefit a cell phone system operator in more than one way.

Within the concept of the present invention the above examples can be combined and co-exist and the invention may also be varied in other ways for the best comfort and security for the user, including different levels of security for different types of transactions and the size of transferred amounts.

The invention can thus primarily be used to increase the security of the card use by complementing the usual measures that is the written confirmation of the user with a phone confirmation before payment is effected.

Secondly the invention can be used to simplify the payment of goods and services. The invention can also be used as a replacement for signature, either unlimited or within a window that can be determined by the card user or card issuer.

In an alternative embodiment of the system of the present invention, a user may register at a telephone operator by sending a photo of the user to the telephone operator. This photo may serve as proof of identity. When the user conducts a transaction, the photo appears on the mobile phone so that the seller can see that the user is a legitimate user of the transaction card. The photo may also be used to identify the owner of the mobile phone should the mobile phone be stolen or otherwise lost.

It is also to use the present invention for paying bills and other transactions over the Internet. The specific account is opened or activated via the mobile telephone as described above. The receiving entity may be an operator such as a bank, financial institution, card issuing company or any other suitable operator that has a web page which the payer can visit. The code that is on the card may then be entered and the payer then presses pay to activate the transaction. The money is then immediately transferred to the receiver to pay the bill. In this way, the payer may use one secure system to carry out a variety of transactions wherein the user is simultaneously using two systems that are integrated by an airborne communication system, such as a mobile telephone system, and a stationary communication system.

While the present invention has been described in accordance with preferred compositions and embodiments, it is to be understood that certain substitutions and alterations may be made thereto without departing from the spirit and scope of the following claims.

The invention claimed is:

1. A method of conducting a transaction, comprising:
providing a specific account, of an user of a communication device, at a telephone operator for charging telecommunication services to;
linking a first card disposed inside the communication device to the specific account at the telephone operator;
providing a transaction card that has a transaction PIN code linked to the specific account;
sending a contact signal to the telephone operator by using the communication device;
the telephone operator receiving the contact signal and identifying a communication PIN code of the first card disposed in the communication device;
the telephone operator associating the communication PIN code with the specific account;
using the communication device for a telecommunication service provided by the telephone operator and the telephone operator charging the specific account for the telecommunication service provided;
initiating a transaction with the transaction card;
entering an amount that is to be paid for the transaction and withdrawn from the specific account wherein the specific account is for charging telecommunication services to when the communication device is used;
sending the transaction PIN code from the communication device to the telephone operator; and
the telephone operator verifying the transaction PIN code with the communication PIN code registered for the specific account and permitting the transaction for the amount by the transaction card based on the verification and the telephone operator charging the amount of the transaction to the specific account.

2. The method according to claim 1 wherein the first card is a SIM card and method further comprises connecting the SIM card and the transaction card during manufacturing of the SIM card and the transaction card and the user separating the SIM card from the transaction card prior to use.

3. The method according to claim 1 wherein the method further comprises calling the telephone operator with a cellphone to provide the transaction PIN number simultaneously with conducting a transaction with the transaction card.

4. The method according to claim 1 wherein the method further comprises opening the specific account by calling the telephone operator and providing a time interval during which the transaction card may be used.

5. The method according to claim 1 wherein the method further comprises opening the specific account by calling the telephone operator and providing a geographical area within which the transaction card is used.

6. The method according to claim 5 wherein the method further comprises linking the geographical area with a geographical position of the communication device to minimize a distance between a location of the transaction and a location of the communication device.

7. The method according to claim 1 wherein the method further comprises registering the communication PIN code at the telephone operator to associate the communication PIN code with the specific account.

8. The method according to claim 1 wherein the method further comprises the user entering a PIN-code as confirmation.

* * * * *